United States Patent
Theimer et al.

(10) Patent No.: US 8,615,793 B2
(45) Date of Patent: Dec. 24, 2013

(54) BLACKLISTING OF FREQUENTLY USED GESTURE PASSWORDS

(75) Inventors: Wolfgang Michael Theimer, Bochum (DE); Thomas Balon, Bochum (DE); Pascal Wissmann, Hamburg (DE)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/301,238

(22) Filed: Nov. 21, 2011

(65) Prior Publication Data

US 2012/0198529 A1  Aug. 2, 2012

Related U.S. Application Data

(60) Provisional application No. 61/438,065, filed on Jan. 31, 2011.

(51) Int. Cl.
*H04L 29/06* (2006.01)
(52) U.S. Cl.
USPC .......... 726/6; 726/25; 726/28; 382/195; 713/183; 705/18
(58) Field of Classification Search
USPC .............................. 726/6; 382/195
See application file for complete search history.

(56) References Cited

U.S. PATENT DOCUMENTS

| | | | |
|---|---|---|---|
| 5,680,460 A | 10/1997 | Tomko et al. | |
| 5,712,912 A | 1/1998 | Tomko et al. | |
| 5,790,668 A | 8/1998 | Tomko | |
| 6,219,794 B1 | 4/2001 | Soutar et al. | |
| 6,249,606 B1 * | 6/2001 | Kiraly et al. | 382/195 |
| 2001/0052851 A1 | 12/2001 | Mathias et al. | |
| 2003/0091218 A1 | 5/2003 | Hamid | |
| 2003/0202687 A1 | 10/2003 | Hamid et al. | |
| 2003/0223624 A1 | 12/2003 | Hamid | |
| 2006/0078171 A1 | 4/2006 | Govindaraju et al. | |
| 2007/0253608 A1 | 11/2007 | Tulyakov et al. | |
| 2009/0150971 A1 | 6/2009 | Vedula et al. | |
| 2010/0169659 A1 * | 7/2010 | Shnowske et al. | 713/183 |
| 2010/0185870 A1 * | 7/2010 | Rane et al. | 713/184 |
| 2012/0110668 A1 * | 5/2012 | Schechter et al. | 726/25 |
| 2012/0272288 A1 * | 10/2012 | Ashbrook et al. | 726/1 |

FOREIGN PATENT DOCUMENTS

JP  2001134491 A2  5/2001

OTHER PUBLICATIONS

Weir et al., "Testing Metrics for Password Creation Policies by Attacking Large Sets of Revealed Passwords", 2010, ACM, pp. 162-175.*

(Continued)

*Primary Examiner* — Taghi Arani
*Assistant Examiner* — Thaddeus Plecha
(74) *Attorney, Agent, or Firm* — Novak Druce Connolly Bove + Quigg LLP

(57) ABSTRACT

A method of maintaining a blacklist for gesture-based passwords is provided. A data store of index values corresponding to gestures is maintained on a blacklist server. Upon receiving a new gesture based password, an electronic device converts the password to an index value and forwards that index value to the blacklist server. The blacklist server increases an occurrence of the received index value by one in a data store and if the increase results in a blacklist threshold being exceeded, the index value is inputted to the blacklist. A notification can be sent back to the electronic device if the forwarded index value is on the blacklist or is inputted to the blacklist.

20 Claims, 9 Drawing Sheets

(56) References Cited

OTHER PUBLICATIONS

Schechter et al.; "Popularity is everything: A new approach to protecting passwords from statistical-guessing attacks"; The 5th USENSIX Workshop on Hot Topics in Security (HotSec '10); Aug. 10, 2010; pp. 1-6.

Tulyakov, S et al.; "Symmetric hash functions for fingerprint minutiae"; International Workshop in Pattern Recognition for Crime Prevention, Security and Surveillance; 2005; 9 pages.

Merkle, Ralph Charles; "Secrecy, authentication, and public key systems"; Stanford Ph.D. thesis 1979, pp. 13-15.

Vielhauer, C. et al.; "Biometric Hash based on Statistical Features of Online Signatures"; Proceedings of the IEEE International Conference on Pattern Recognition (ICPR), 2002; 5 pages.

Kohone, T.; "Self-Organizing Maps"; Proceedings of the IEEE; vol. 78, No. 9; Sep. 1990; pp. 1464-1480.

Damgard, I.; "A Design Principle for Hash Functions"; In Advances in Cryptology—CRYPTO '89 Proceedings, Lecture Notes in Computer Science vol. 435, G. Brassard, ed, Springer-Verlag, 1989, pp. 416-427.

Extended European Search Report dated Mar. 16, 2012 from corresponding European patent application No. 11189971.2; 6 pages.

Thorpe, J. et al.; "Towards Secure Design Choices for Implementing Graphical Passwords"; Computer Security Applications Conference; 20th Annual Tuscon, AZ, USA; Dec. 6, 2004; pp. 50-60; XP010757562.

Anonymous; "The Top 500 Worst Passwords of All Time"; What's My Pass?; Nov. 30, 2008; retrieved on Feb. 15, 2012; pp. 3-12; XP002669608.

Office Action for Canadian Application No. 2,765,827 dated Sep. 30, 2013.

* cited by examiner

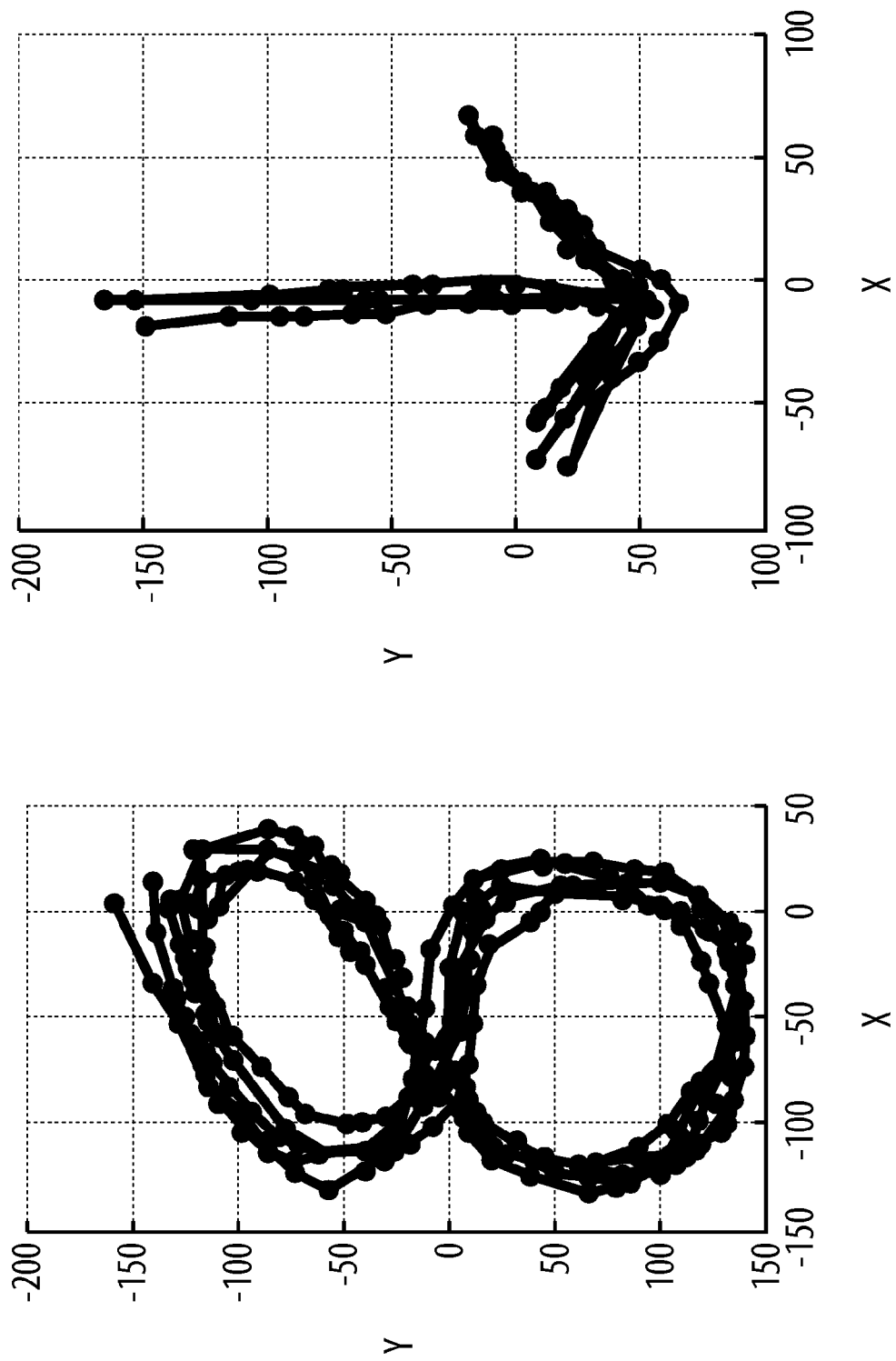

BLACKLISTING OF FREQUENTLY USED GESTURE PASSWORDS

RELATED APPLICATION

This application claims priority from and the benefit of the filing date of U.S. Provisional Application No. 61/438,065, filed on Jan. 31, 2011, which is incorporated herein by reference.

TECHNICAL FIELD

The present disclosure relates generally to blacklisting of passwords.

BACKGROUND

Touch screen devices are proliferating in the mobile space. Via a virtual keyboard it is possible to enter characters or other symbols, but typically a physical keyboard is better suited and faster for text input.

Passwords may be used in many situations where a user needs to be authenticated. Situations requiring authentication may include the ability to access or use a computer, mobile phone, PDA, or any other device; they may also enable access to a physical location, or allow use of a credit/debit card or similar instrument. Passwords are typically alpha-numeric strings or sequences entered on a keyboard.

In some cases a blacklist of alpha-numeric strings that can not be used as passwords is maintained to prevent users from choosing passwords that are common or easy for a third party to determine.

BRIEF DESCRIPTION OF THE DRAWINGS

FIGS. 3a to 3c are three examples for common symbols, drawn multiple times on a touch screen;

Like reference numerals are used in the drawings to denote like elements and features.

DETAILED DESCRIPTION OF EXAMPLE EMBODIMENTS

Figure 1:
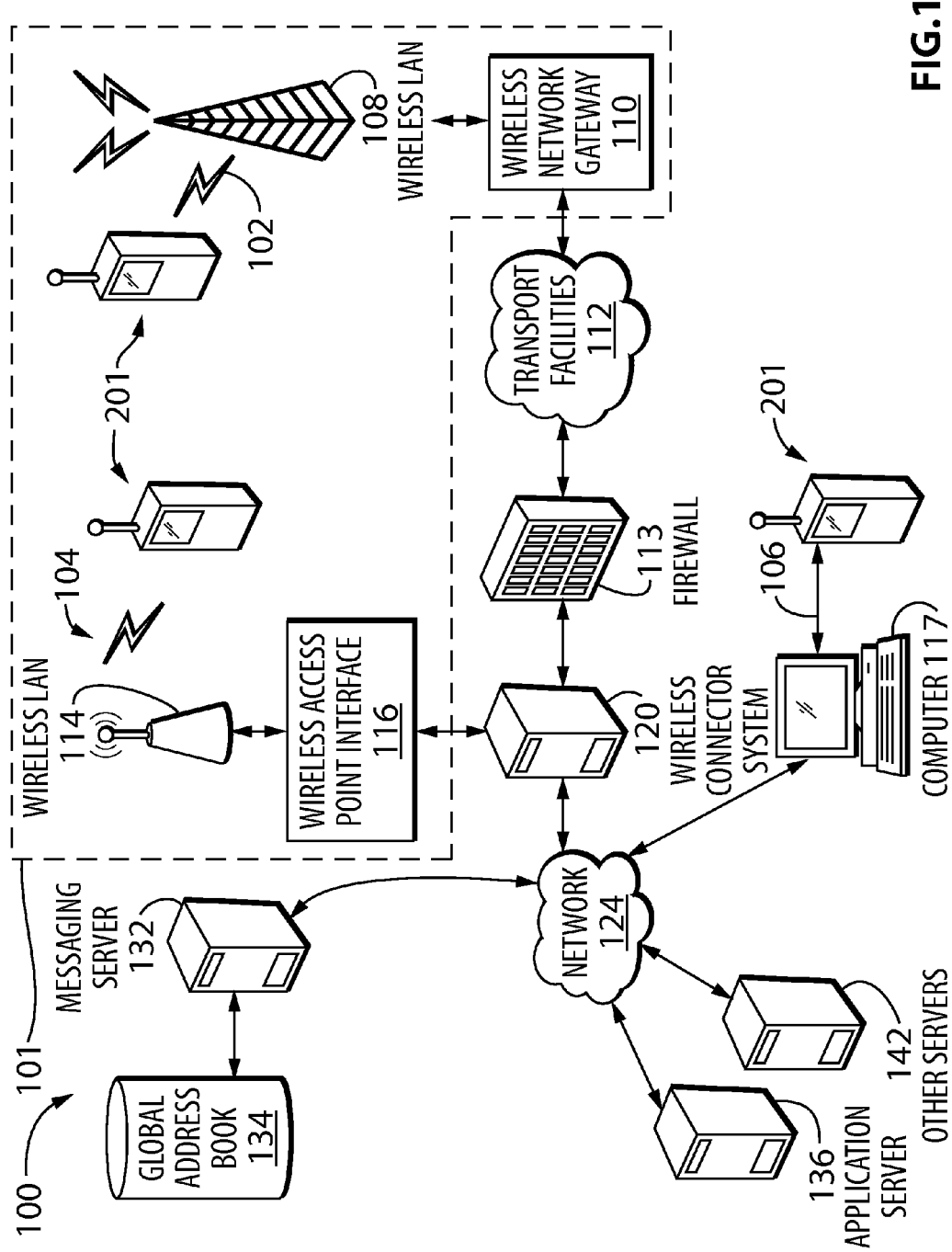
FIG. 1 is a block diagram illustrating a communication system including a mobile communication device in which example embodiments of the present disclosure can be applied.

One concept of authentication on a device with a touch screen uses a touch gesture as a replacement for a character password. As with character passwords, password gestures should fulfill standard security criteria, such as but not limited to having a measurable password security to guarantee that only the proper users gain access. Furthermore, a password gesture must be remembered by the user.

Abstracting the gesture concept from a touch screen implementation can lead to a generalized trajectory description which is characterized as a sequence of 3D points or n-dimensional features in time. This could exemplarily be implemented by using accelerometer/gyroscope sensors or time-of-flight cameras. A user could for example draw a gesture in the air with his accelerometer-equipped mobile device. The sequence of acceleration values in the different spatial dimensions as a function of time would then constitute the trajectory information. In this example the spatial trajectory would be replaced by a pattern of accelerations along the trajectory. This disclosure will only refer to gestures, regardless of which technology is used to sense the gestures and which dimensionality the gestures have.

There is a trade-off between high password security (calling for complex gestures) and easy memorability of the gesture (implying simple gestures). One potential solution to this dilemma is the use of known symbols, like characters and other simple graphical sketches. The user can easily remember the shape of the gesture since symbols have a quite strictly defined outline. But there is also the danger that intruders simply enter gestures derived from known symbols because they are more probable than any other free-form gesture. For character passwords the equivalent security threat is the use of dictionary words as passwords.

In some embodiments of different pattern recognition tasks, inputs which should be rejected are modeled by providing examples for a blacklist. Input patterns are often high-dimensional signals and it is not feasible to provide a complete list of inputs to reject due to the enormous amount of data. Therefore, blacklisting examples are provided and similar inputs are discarded as well.

The security of a password gesture is inversely proportional to the probability that it is produced by the users. In other words: The more unlikely a gesture is, the better it qualifies as a character password replacement. In the case of character passwords, an unlikely password contains a large number of characters in a simplistic concept. But users can also remember long passwords if they have a well-known meaning such as being words from a dictionary. Therefore character passwords from a dictionary are strongly discouraged. To adopt this idea for gesture passwords, commonly known gestures, e.g. representing letters, digits or other symbols, have to be identified. These gestures might be complex, but are more likely to appear since they are known to users. Common gestures can be simple trajectories which can be rejected based on some rules, such as but not limited to: too short duration/length; or not enough curvature. Complex common gestures, e.g. sketches of known symbols, can be pre-registered in a blacklist. But there will also be unexpected common gestures with higher occurrence rate. These gestures can be learned by accumulating user statistics.

In an embodiment, statistics of common gestures are collected at a central place. However, a direct representation of a gesture password should not leave the user's device to avoid an interferer reading the password information. One solution to this problem is to use a non-invertible mapping function to transform the gesture representation into a description, which in some embodiments is shorter than the direct representation. This can, for example, be an index value with similarity-preserving properties. Two similar gestures are mapped to two index values with low distance to each other. The mapping function is designed to minimize the number of conflicts where two completely different gestures are mapped to the same index value.

A directory of index values can be maintained centrally without compromising the gesture password security. In some embodiments, index values with high occurrence rates are reported back to the respective users. Those index values indicate related gesture passwords which are often used and thus should be avoided. By accumulating statistics of index values from many users, a blacklist is learned over time. In addition the index can be initialized by feeding in already known symbols.

Thus, in a first aspect, there is provided a method for blacklisting gesture based passwords, the method for implementation on a blacklist server and comprising: receiving an index value representing a gesture based password from an electronic device; increasing an occurrence of the received index value by one in a data store of index values; determining if increasing the occurrence of the received index value in the data store results in a blacklist threshold being exceeded; and if the blacklist threshold is exceeded, updating a blacklist stored on the blacklist server to include the received index value.

In a second aspect, there is provided a method for implementation on an electronic device for updating a blacklist stored on a blacklist server: receiving a gesture based password via an input interface; converting the gesture based password into a non-invertible similarity preserving index value; and transmitting the index value to a blacklist server.

In a third aspect, there is provided one or more computer readable media having computer readable instructions stored thereon that when executed by a processor implement any one of the methods described herein.

In a fourth aspect, there is provided an electronic device comprising: a processor; a memory having computer readable instructions stored thereon that when executed by the processor implement any one of the methods described herein for implementation on an electronic device; an input interface for receiving the gesture based password.

In a fifth aspect, there is provided a blacklist server comprising: a processor; a memory having computer readable instructions stored thereon that when executed by the processor implement any one of the methods described herein for implementation on a server; and a receiver for receiving the index value.

In some embodiments, the index value is a non-invertible index value.

In some embodiments, the index value is a similarity preserving index value.

In some embodiments, the index value is a non-invertible similarity preserving index value.

Embodiments of the present application are not limited to any particular operating system, mobile device architecture, server architecture, or computer programming language.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120, may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as internet content or content from an organization's internal servers to the mobile communication devices 201 in the wireless network 101, and an application server for implementing server-based applications. A directory of index values corresponding to gesture based passwords can be maintained on any of the servers described herein, such as but not limited to the application server 136.

The global address book 134 comprises electronic contact records generated and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 142 (other servers) or application servers 136. Conversely, the wireless connector system 120 sends data packets received, for example, from the messaging server 132 or other server 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 142 and application server 136.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
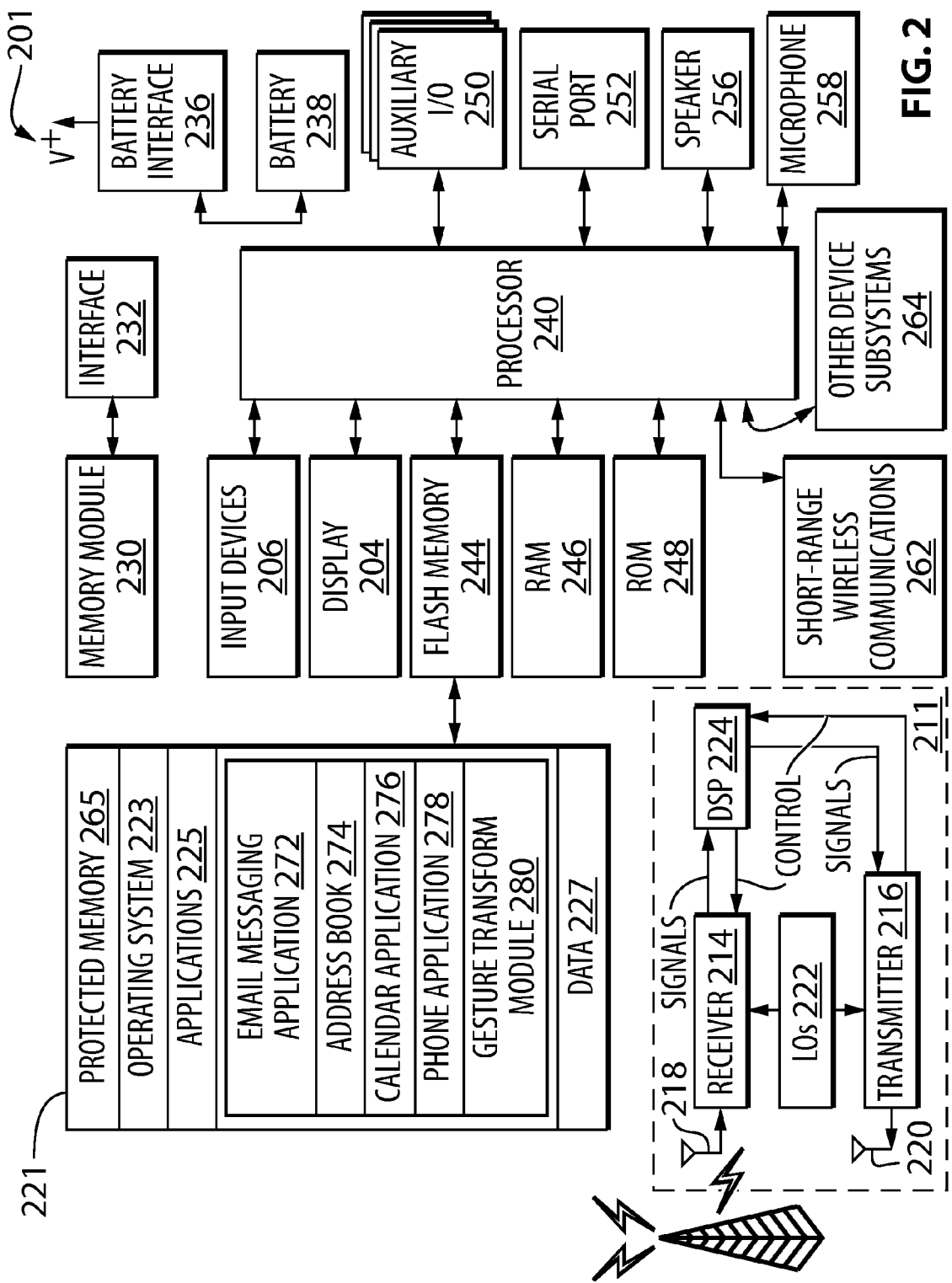
FIG. 2 is a block diagram illustrating a mobile communication device in accordance with one example embodiment of the present disclosure.

Reference is now made to FIG. 2 which illustrates an exemplary embodiment of the mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and gesture transform module 280. Example embodiments of the gesture transform module 280 will be discussed in detail later herein. It is recognized that the gesture transform module 280 and its various components as described herein can form a discrete module running on the device 201, or the functions of the gesture transform module 280 can be distributed on the device 201 as separate modules or integrated within other existing modules as desired. Such discrete or distributed implementations all fall within the embodiments of the gesture transform module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a touchpad, a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

In order to compare gestures, for example for blacklisting, a common form of representing the gestures is beneficial. One option is to represent the gesture as a trajectory in 2D or 3D space and possibly ignoring the time stamps of all points to allow for variability. Transforming gestures also makes the gestures better comparable. Non-limiting examples of transforming include translation, rotation and scaling operations. Thus in some embodiments, gestures are made invariant against changes in position, rotation angle or size and are represented as the same gesture. Additionally, gestures are difficult to reproduce exactly by the users. Therefore, in some embodiments, each point on a trajectory in a gesture has a variability which can be modeled by a deviation, such as but not limited to a standard deviation, from the ideal position.

In some embodiments, the mathematical representation of the gesture is a sequence of points and timestamps $(x_i, t_i)$ with $i \in [1, N]$. All gestures are brought to the same position, rotation angle and scale by invariance operations. In addition, in some embodiments, the gestures are interpolated to yield the same number of points for each gesture. This makes the comparison of gestures much easier.

Figure 3A:
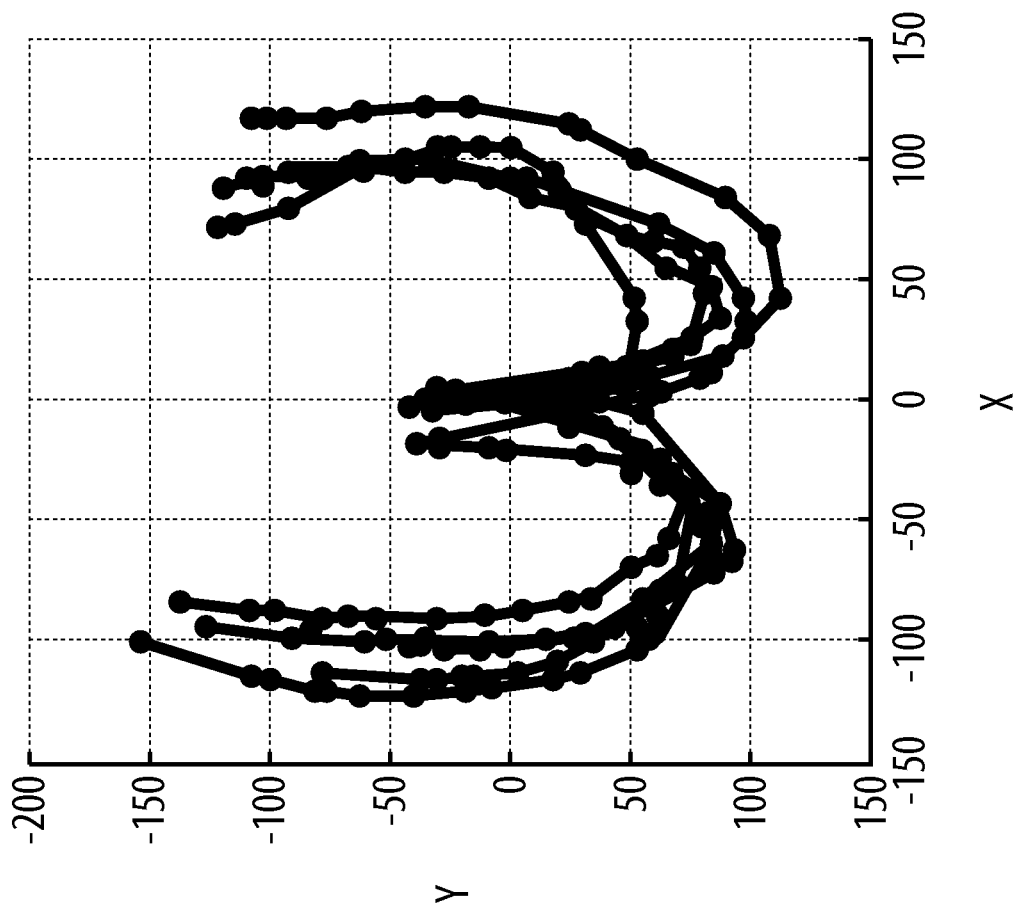

Three examples for common symbols, drawn multiple times on a touch screen, can be seen in FIGS. 3*a* to 3*c*. Three symbols, "W" (FIG. 3*a*), "8" (FIG. 3*b*) and a down arrow (FIG. 3*c*) are shown. This trajectory representation should not leave the user terminal, unless encrypted or in a format that cannot be deciphered, as doing so would allow an intruder to replicate the gesture directly.

A blacklisting server is proposed for the collection of user gesture statistics to identify frequently entered similar gestures without being able to reconstruct individual gestures. The blacklist can be used to warn the user if (s)he enters a common gesture as a password. Thus, in some embodiments, a transformed gesture representation deliberately reduces the information content to prevent the gesture reconstruction. At the same time the transformation in some embodiments maps similar gestures to similar representations, thus allowing a similarity comparison and the accumulation of gesture occurrence frequencies from multiple users.

In summary, in some embodiments, each gesture input as a password is normalized to the same number of points, size and/or orientation. This makes comparison of the gestures less complicated. After normalization, the gesture is converted to a vector or index value. Normalization also decreases the size of the index value and thus the amount of data that is required to be sent to a blacklist server, for example. Because of the normalization, similar gestures may result in the same index value and inverting the index to the exact gesture is difficult. The index value can be input into a data store, such as but not limited to a database, and a determination can be made as to whether the addition of the index value results in a threshold for a number of incidences of that index value in the data store being exceeded. If the threshold is exceeded, the index value can be added to a blacklist. In some embodiments, a self-organizing map (SOM) is used. As each index value or vector is transferred to the SOM a neuron corresponding to the index value is fired. The number of times a neuron is fired is tracked and if that number exceeds a threshold value, the index value can be added to a blacklist. In some embodiments, the threshold value can be determined by a number of times a group of neighbouring neurons are fired.

One example method to achieve a similarity preserving mapping is the self-organizing map (SOM), originally developed by Kohonen (see for example T. Kohonen "Self-Organizing Maps" Springer-Verlag, $3^{rd}$ edition 2001). In general, a high-dimensional input vector v is mapped onto a grid of neurons. In some embodiments, the grid of neurons is a 2D map or another lower dimensionality grid compared to the input vector. The SOM concept consists of the training phase and the actual mapping phase, both of which are described in the following paragraphs.

SOM Training

Each neuron i in the grid has a receptive field with a weight vector $w_i$ which has the same dimensionality as the input vector. The weight vectors are initialized e.g. with random values. One stroke of a gesture input (sequence of points) is interpolated by a fixed number of points N. The input vector $v = (x_1, x_2, \ldots, x_N)^T$ does not include the time stamps of the individual points so that only the shape of the gesture, but not its timing is captured.

The weights $w_i$ of neuron $i_{opt}$ that are closest to the input vector, i.e. have the smallest Euclidian distance, are adapted in the direction of the input vector v. Also the weights of the surrounding neurons in the grid are adapted in the same direction, but to a lesser extent. Over time the adaptation rate $\alpha(t)$ and the spatial extent of the "adaptation zone" $\theta(i, i_{opt}, t)$ around $i_{opt}$ are reduced to freeze the trained input weights. In a non-limiting example, the plasticity, i.e. how strongly weights are adapted, is reduced by a pre-defined mathematic function. If time progresses, the weight changes go down to zero. Mathematically speaking the weight adaptation is implemented as $w_i^{(t+1)} = w_i^{(t)} + \alpha(t) \theta(i, i_{opt}, t) (v - w_i^{(t)})$ with $i_{opt} = \arg\min(\|v - w_i^{(t)}\|)$. The function $\alpha(t)$ could for example be a decaying exponential $\alpha(t) = c_1 e^{-c_2 t}$ with $c_1 > 0$, $c_2 > 0$ and $\theta(i, i_{opt}, t)$ a Gaussian, centered around $i_{opt}$.

Figure 4:
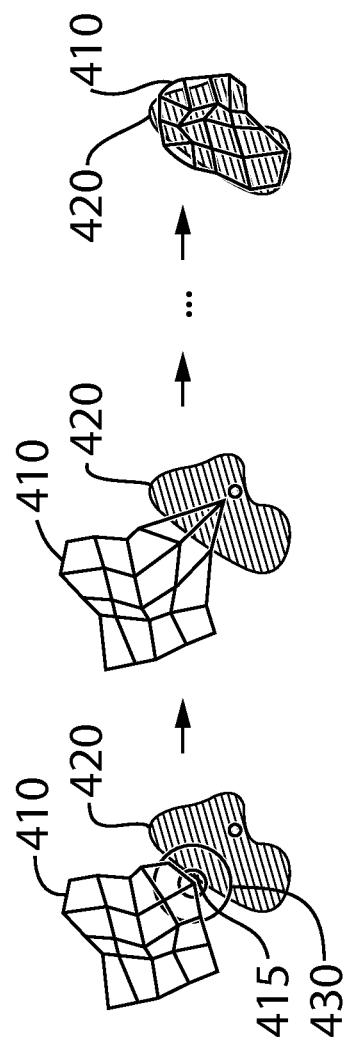
FIG. 4 depicts an example how a self-organizing map (SOM) adapts to input statistics.

An example how a SOM adapts to the input statistics is shown in FIG. 4. For illustration purposes the input is a two-dimensional shaded cloud 420 and the neurons are at the intersection of the grid lines 410. The clear circle represents one input vector 430 and one can see that the input weights of the closest grid neuron 415 and its neighbours are adapted towards the clear circle 430.

SOM Input Vector Mapping

Once the training is finished by presenting a large number of typical input vectors, the weight vectors remain constant. New input vectors are presented to the SOM network and for each input the most responsive neuron $i_{opt} = \arg\min(\|v - w_i\|)$ is returned.

Application to Gesture Blacklisting

In an example embodiment, the SOM concept is applied to server-based blacklisting by performing the SOM training with input vectors consisting of a large number of gesture strokes. In some embodiments, this training takes place on a server which resides in the network and can be reached by all users, using gestures anonymously entered by users. During SOM training the different gestures are each entered with the same frequency so that the emerging self-organizing map is not reflecting different gesture occurrence rates, which would distort the map.

In some embodiments, the resulting weight vectors $w_i$ for each neuron are transferred to end user electronic devices. When a user selects a new gesture stroke, the user trains the gesture stroke. The trained gesture stroke is mapped locally in the electronic device to the most responding or closest neuron. The index of this most responding neuron is transmitted to the server which collects user statistics and increments the occurrence count of the respective neuron. After collecting the mapped neuron indices of many users, some neurons will dominate the occurrence probability distribution. Users sending these neuron indices are informed that their underlying password gesture might be insecure since similar ones are used by many users. This embodiment does not produce a one-to-one mapping, so the server will likely issue false alarms to be on the safe side. The larger the neuron grid is, the more specific mappings can be created during the training phase. In some embodiments the map has a toroid structure, i.e. a wrap-around in order to avoid boundary problems. A boundary problem emerges when a map does not extend indefinitely or in other words is not a complete plane. In such circumstances, many inputs are mapped to the boundary of the map, despite being very different. However, it is not feasible to have an indefinitely large map as the number of neurons becomes unmanageably large. Therefore, a solution to avoid boundaries is a "wrap-around map", i.e. a toroid.

A password gesture can consist of multiple strokes, where one stroke starts when the finger touches the screen and ends when it is lifted. In an example embodiment, every stroke of a password gesture is mapped individually to a neuron index and the sequence of indices is sent to the server. In some embodiments, the user is requested to train a new password only if a percentage of the indices are frequently occurring. In another example embodiment, the strokes of a gesture password are concatenated (increasing the input dimensionality) and the entire password is mapped to one neuron. Mapping of individual strokes to neurons provides more statistical input and lower input dimensionality.

Example Embodiment of Gesture Training with Server-Based Blacklist Check

Figure 5:
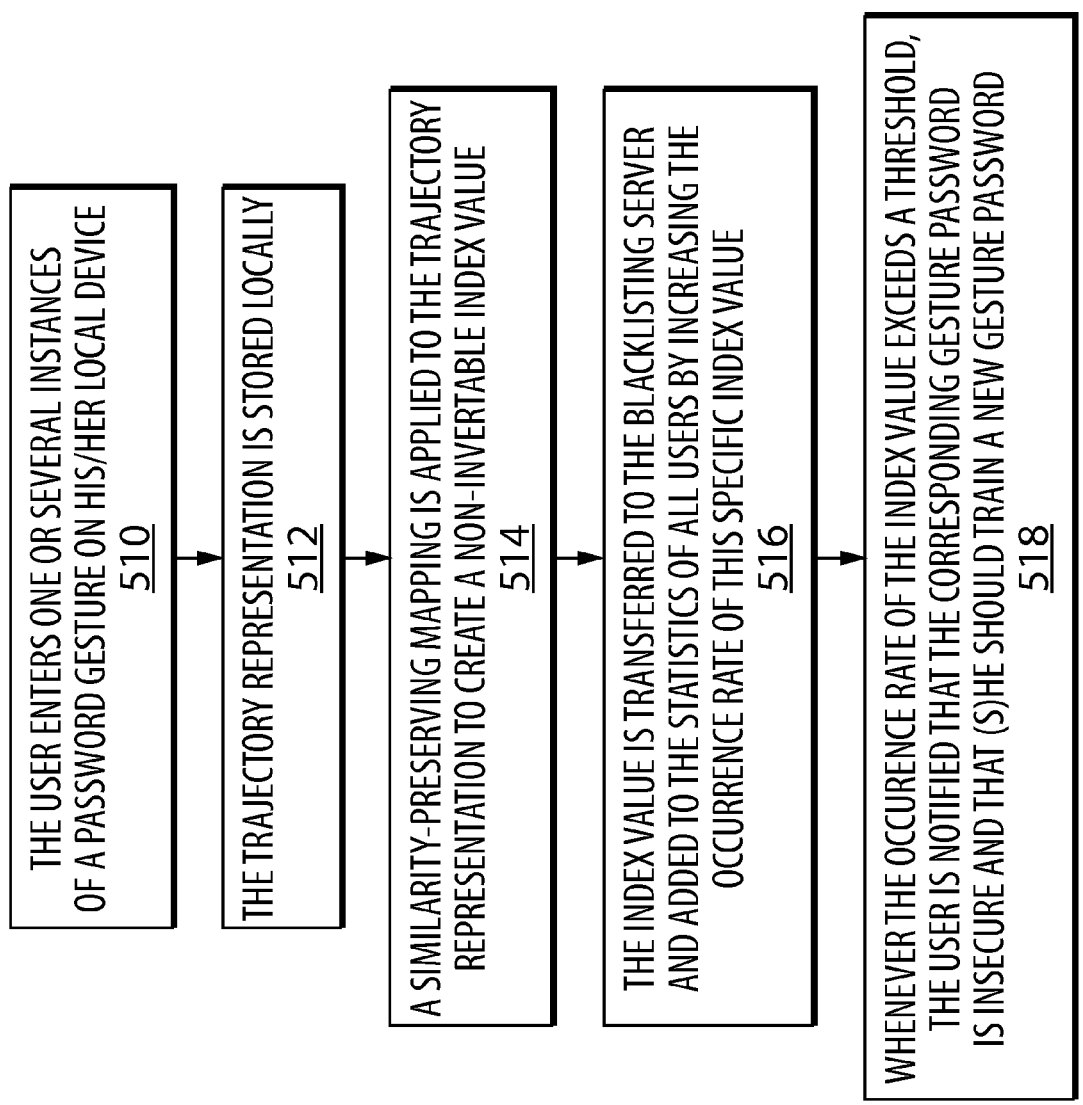
FIG. 5 is a flowchart of a method in accordance with one example embodiment of the present disclosure.

Using the gesture representations on the user's device and on a central server as described above, an example embodiment of a method implementing a gesture blacklisting concept will now be described with reference to FIG. 5.

At action 510, the user enters one or several instances of a password gesture on his/her local device. At action 520, the trajectory representation is stored locally. At action 530 a similarity-preserving mapping is applied to the trajectory representation to create a non-invertible index value. At action 540 the index value is transferred to the blacklisting server and added to the statistics of all users by increasing the occurrence rate of this specific index value. At action 550, whenever the occurrence rate of the index value exceeds a threshold, the user is notified that the corresponding gesture password is insecure and that (s)he should train a new gesture password.

In some embodiments, the user ID is not stored on the server when the user sends the index value for the newly trained password gesture, only the number of users is registered. This would be sufficient for the blacklisting concept.

In some embodiments, the gesture index value is saved together with the user ID, thus enabling a central authentication. In addition, in some embodiments, the system could store the dates when the password has been changed in the past and request to train a new gesture password when the validity time interval expires or the training example is too similar to an already used password gesture.

Figure 6:
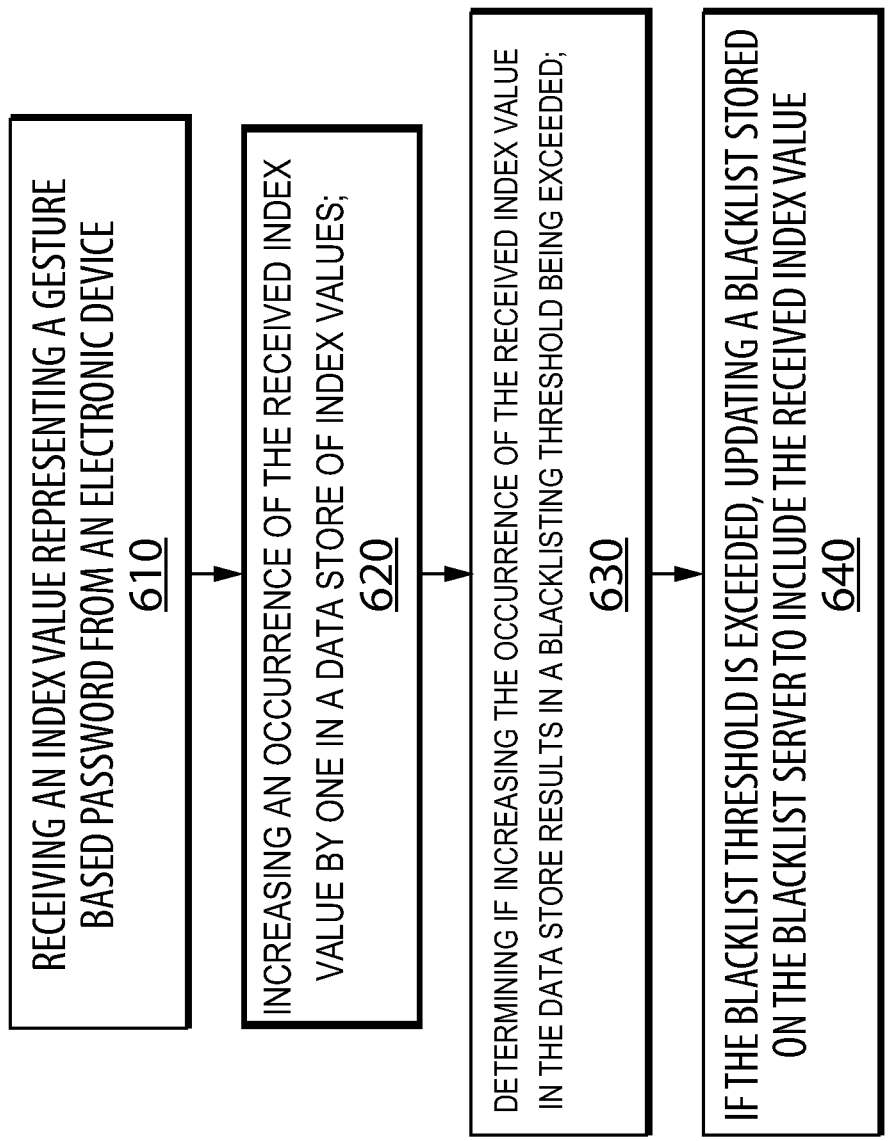
FIG. 6 is a flowchart of a method in accordance with one example embodiment of the present disclosure.

Referring now to FIG. 6 an embodiment of a method for blacklisting gesture-based passwords to be implemented on a blacklist server will be described. At action 610 an index value representing a gesture based password is received from an electronic device. At action 620 an occurrence of the index value is increased in a data store of index values. At action 630 the server determines if increasing the occurrence of the received index value in the data store results in a blacklist threshold being exceeded. At action 640, if the blacklist threshold is exceeded, updating a blacklist stored on the blacklist server to include the received index value. In some embodiments, the index value is a similarity preserving index value. In some embodiments, the index value is non-invertible. In some embodiments, the index value is a non-invertible similarity-preserving index value.

In some embodiments updating the blacklist comprises only inputting the received index value to the blacklist if the received index value is missing from the blacklist.

In some embodiments the method further comprises receiving a plurality of index values from an input interface to populate the data store and inputting the plurality of index values to the data store. The method can additionally comprise, for each index value inputted to the data store, determining if a number of the index values in the data store having a value within a threshold range of the inputted index value exceeds a blacklist threshold and if the number exceeds the blacklist threshold, inputting the inputted index value to a blacklist stored on the blacklist server.

In some embodiments determining if increasing the occurrence of the received index value results in exceeding the blacklist threshold comprises determining if a number of the index values in the data store having a value within a threshold range of the received index value exceeds the blacklist threshold.

In some embodiments determining if increasing an occurrence of the received index value results in a blacklist threshold being exceeded comprises determining if inputting the received index value results in a weight of a corresponding neuron in a self-organizing map exceeding a weight threshold.

In some embodiments, the method further comprises creating a self-organising map of neurons, the neurons representing input vectors corresponding to gestures. Creating the self-organising map, in some embodiments comprises: receiving a plurality of gestures, each gesture being received multiple times at the same frequency as the other gestures; converting each of the plurality of gestures into an input vector; for each input vector, adapting a weight of a closest neuron in a direction of the input vector. In some embodiments, the method further comprising assigning a non-invertible similarity preserving index value to each neuron.

In some embodiments, a copy of the self-organising map is transmitted to the electronic device.

In some embodiments, if the blacklist threshold is exceeded, a notification is transmitted to the electronic device indicating that the gesture based password is blacklisted.

In some embodiments, the method further comprises receiving a user identifier associated with the received index value; and storing the user identifier in the data store in association with the received index value.

In some embodiments, the method further comprises storing a received time in association with the received index in the data store. The method can further comprise monitoring the received time and when a difference between the received time and a present time exceeds a time threshold, transmitting an expiry notification to the electronic device indicating that the password has expired.

Figure 7:
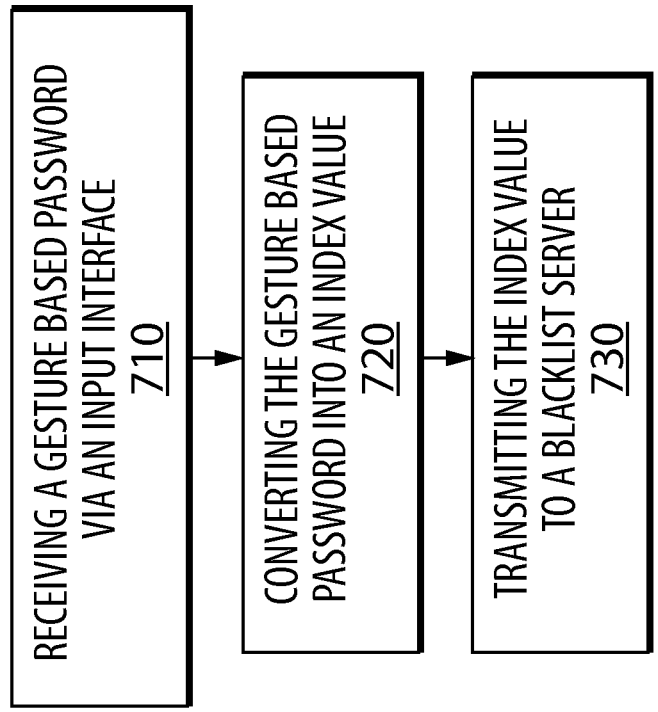
FIG. 7 is a flowchart of a method in accordance with one example embodiment of the present disclosure.

Referring now to FIG. 7, a method for implementation on an electronic device for updating a blacklist stored on a blacklist server will now be described. At action 710 a gesture based password is received via an input interface. At action 720 the gesture based password is converted into an index value. At action 730, the index value is transmitted to a blacklist server. In some embodiments, the index value is a similarity preserving index value. In some embodiments, the index value is non-invertible. In some embodiments, the index value is a non-invertible similarity-preserving index value.

In some embodiments, the method further comprises receiving an indication from the blacklist server of whether or not the index value corresponds to a blacklisted gesture.

In some embodiments, the method further comprises receiving a self-organising map (SOM) from the blacklist server, the SOM including neurons, the neurons representing input vectors corresponding to gestures; converting at least one gesture of the password into an input vector; and mapping the input vector to the SOM. Converting the gesture based password into the index value comprises assigning an index value corresponding to a neuron of the SOM closest to the input vector.

In some embodiments, the electronic device outputs a notice to a user interface indicating that a new password must be selected if the index value corresponds to a blacklisted gesture.

Figure 8:
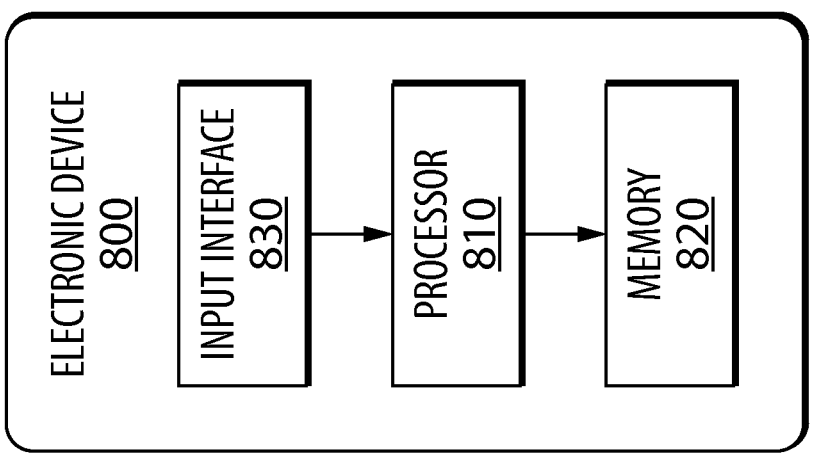
FIG. 8 is a block diagram of an electronic device in accordance with one example embodiment of the present disclosure.

Referring now to FIG. 8, an electronic device 800 in accordance with an example embodiment will be described. The electronic device 800 comprises a processor 810, a memory 820 and an input interface 830. The memory 820 has computer readable instructions stored thereon that when executed by the processor implement any of the methods described herein for implementation on an electronic device. The input interface 830 is for receiving the gesture based password.

Non-limiting examples of the input interface 830 are a touch screen, an accelerometer sensor, a gyroscope sensor and a camera.

Figure 9:
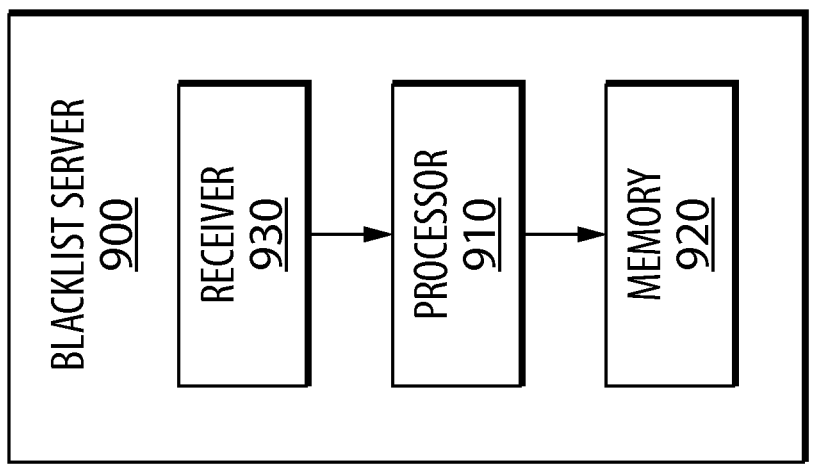
FIG. 9 is a block diagram of a blacklist server in accordance with one example embodiment of the present disclosure.

Referring now to FIG. 9, an example embodiment of a blacklist server 900 will be described. The blacklist server 900 comprises a processor 910, a memory 920 and a receiver 930. The memory 920 has computer readable instructions stored thereon that when executed by the processor implement any of the methods disclosed herein for implementation on a server. The receiver 930 is for receiving the non-invertible similarity preserving index value.

A non-limiting example of the blacklist server 900 is an authentication server. Alternatively, a generic server located in the internet could be used. In some embodiments, the sole purpose of the server is to check if gestures are blacklisted.

Embodiments of the blacklisting concepts described herein for gesture based passwords increase the security level for authentication purposes by avoiding common gesture inputs. Even blacklists with larger numbers of gestures can be verified since the check is only needed at the beginning during the training phase, i.e. it is not time critical. The implementation of the gesture blacklisting based on index values does not require significant processing and even large index tables can be checked efficiently. The storage of gesture index values on the server does not compromise password security on the user's terminal.

The check for passwords needs to cope with imperfect user gesture input. Thus a perfect match of training and test gesture is almost impossible. This needs to be taken into account in the design of the similarity-preserving mapping between gesture and index value.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus and articles of manufacture, also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for blacklisting gesture based passwords, the method for implementation on a blacklist server and comprising:

receiving an index value from an electronic device that is physically separate from the blacklist server, the index value representing a gesture based password that was received by the electronic device and was not received by the blacklist server, the index value being a similarity-preserving index value, wherein the similarity-preserving index value is such that similar gestures are mapped to index values having low distance to each other;

increasing an occurrence of the received index value by one in a data store of index values;

determining if increasing the occurrence of the received index value in the data store results in a blacklist threshold being exceeded; and if the blacklist threshold is exceeded, updating a blacklist stored on the blacklist server to include the received index value.

2. The method of claim 1, wherein updating the blacklist comprises only inputting the received index value to the blacklist if the received index value is missing from the blacklist.

3. The method of claim 1, further comprising:

receiving a plurality of index values from an input interface to populate the data store; and inputting the plurality of index values to the data store.

4. The method of claim 3, further comprising: for each index value inputted to the data store, determining if a number of the index values in the data store having a value within a threshold range of the received index value exceeds a blacklist threshold and if the number exceeds the blacklist threshold, adding the received index value to a blacklist stored on the blacklist server.

5. The method of claim 1, wherein determining if increasing the occurrence of the received index value results in exceeding the blacklist threshold comprises determining if a number of the index values in the data store having a value within a threshold range of the received index value exceeds the blacklist threshold.

6. The method of claim 1, wherein determining if increasing the occurrence of the received index value results in a blacklist threshold being exceeded comprises determining if inputting the received index value results in a weight of a corresponding neuron in a self-organizing map exceeding a weight threshold.

7. The method of claim 1, further comprising creating a self-organising map of neurons, the neurons representing input vectors corresponding to gestures.

8. The method of claim 7, wherein creating the self-organising map comprises:

receiving a plurality of gestures, each gesture being received multiple times at the same frequency as the other gestures;

converting each of the plurality of gestures into an input vector;

for each input vector, adapting a weight of a closest neuron in a direction of the input vector.

9. The method of claim 7, wherein creating the self-organising map comprises:

receiving a plurality of gestures, each gesture comprising one or more strokes and being received multiple times at the same frequency as the other gestures;

converting each stroke of the plurality of gestures into an input vector;

for each input vector, adapting a weight of a closest neuron in a direction of the input vector.

10. The method of claim 8, further comprising assigning an index value to each neuron.

11. The method of claim 6, further comprising transmitting a copy of the self-organising map to the electronic device.

12. The method of claim 1, further comprising:
if the blacklist threshold is exceeded, transmitting a notification to the electronic device indicating that the gesture based password is blacklisted.

13. The method of claim 1, further comprising:
receiving a user identifier associated with the received index value; and
storing the user identifier in the data store in association with the received index value.

14. The method of claim 1, wherein the index value is non-invertible.

15. One or more non-transitory computer readable media having computer readable instructions stored thereon that when executed by a processor implement a method for blacklisting gesture based passwords, the method for implementation on a blacklist server and comprising:
receiving an index value from an electronic device that is physically separate from the blacklist server, the index value representing a gesture based password that was received by the electronic device and was not received by the blacklist server, the index value being a similarity-preserving index value, wherein the similarity-preserving index value is such that similar gestures are mapped to index values having low distance to each other;
increasing an occurrence of the received index value by one in a data store of index values;
determining if increasing the occurrence of the received index value in the data store results in a blacklist threshold being exceeded; and
if the blacklist threshold is exceeded, updating a blacklist stored on the blacklist server to include the received index value.

16. A server comprising:
a processor; and
a memory having computer readable instructions stored thereon for blacklisting gesture based passwords, the instructions when executed by the processor, direct the server to:
receive an index value from an electronic device that is physically separate from the blacklist server, the index value representing a gesture based password that was received by the electronic device and was not received by the blacklist server, the index value being a similarity-preserving index value,
wherein the similarity-preserving index value is such that similar gestures are mapped to index values having low distance to each other;
increase an occurrence of the received index value by one in a data store of index values;
determine if increasing the occurrence of the received index value in the data store results in a blacklist threshold being exceeded; and
if the blacklist threshold is exceeded, update a blacklist stored on the blacklist server to include the received index value.

17. The server of claim 16 wherein the instructions further direct the server to:
receive a plurality of index values from an input interface to populate the data store; and
input the plurality of index values to the data store.

18. The server of claim 17 wherein the instructions further direct the server to create a self-organising map of neurons, the neurons representing input vectors corresponding to gestures.

19. The server of claim 18 wherein the instructions further direct the server to:
receive a plurality of gestures, each gesture being received multiple times at the same frequency as the other gestures;
convert each of the plurality of gestures into an input vector; and
for each input vector, adapt a weight of a closest neuron in a direction of the input vector.

20. The server of claim 16 wherein the index value is non-invertible.

* * * * *